United States Patent [19]

Quermann

[11] 4,283,960
[45] Aug. 18, 1981

[54] GYROSCOPE INDEXING DRIVE MECHANISM

[75] Inventor: Thomas R. Quermann, Huntington Station, N.Y.

[73] Assignee: Sperry Corporation, New York, N.Y.

[21] Appl. No.: 67,842

[22] Filed: Aug. 20, 1979

[51] Int. Cl.³ .............................................. G01C 19/38
[52] U.S. Cl. ..................................... 74/5.41; 33/326; 33/327; 74/5.47; 74/5.9
[58] Field of Search ......................... 74/5.41, 5.47, 5.9, 74/5.22; 33/324, 326, 327

[56] References Cited

U.S. PATENT DOCUMENTS

| 2,386,176 | 10/1945 | White | 74/5.47 |
| 3,276,269 | 10/1966 | Whitehead | 74/5.41 X |
| 3,936,948 | 2/1976 | Maselli | 33/324 X |
| 4,033,045 | 7/1977 | Wing | 33/327 X |
| 4,109,391 | 8/1978 | Wing | 33/327 X |

Primary Examiner—Rodney H. Bonck
Attorney, Agent, or Firm—Howard P. Terry

[57] ABSTRACT

The gyrocompass includes an improved indexing mechanism whereby the mechanical position of the gyroscope casing with respect to two orthogonal components of input rate may be measured.

8 Claims, 11 Drawing Figures

GYROSCOPE INDEXING DRIVE MECHANISM

BACKGROUND OF THE INVENTION

1. Field of the Invention

The invention generally relates to control systems for improving the operation of gyroscopic instruments and more particularly relates to a gyroscopic indexing mechanism applicable, for example, in precision gyrocompasses.

2. Description of the Prior Art

As is well understood in the prior art, there are two basic reasons for mechanically indexing a gyrocompass sensitive unit. The first provides a means for detecting case fixed drift errors of the gyroscope so that their adverse effects can be eliminated, while the second facilitates measurement of the two components of an input rate with a gyroscope having a single sensitive axis.

In the first instance, the gyroscope casing is normally indexed at 0° and 180° with respect to an earth-fixed index so that the sign of any measured rate is reversed. Then, by subtracting the rate measured in one position of the case from that measured with the case index at 180°, the resulting measure is twice the gyro input rate and is independent of any fixed gyro drift, since the latter cancels out of the picture.

In the second application of gyro indexing, the gyroscope casing is normally indexed at 0° and 90° with respect to an earth-fixed index so that a gyroscope sensitive element with a single input axis can measure the orthogonal components of the input rate. It is this configuration which finds application, for instance, in a land compass. The gyroscope is indexed at 0° and 90° about a substantially vertical axis so that the single sensitive axis can measure the two orthogonal horizontal components of earth's rate. The azimuth orientation of the gyro case is then computed in the conventional manner as the arctangent of the quotient of the two measurements.

SUMMARY OF THE INVENTION

The present invention concerns an improved indexing mechanism whereby the mechanical position of a gyroscope casing with respect to a fixed mounting reference is changed with precision between two locations so that two orthogonal horizontal componemts of the earth's rate may be accurately detected.

DESCRIPTION OF THE PREFERRED EMBODIMENTS

While the invention has application in a variety of gyroscopic instruments, it will be discussed by way of example as applied to an instrument known as the land gyrocompass. Such an instrument actually employs a two degree of freedom gyroscope; however, one axis is so highly pendulous that the sensitive element behaves essentially like a single degree of freedom gyro with its output axis disposed substantially vertically. It cooperates with a pick-off and torquer respectively for measuring displacements of the supporting gimbal about the vertical axis and for applying torque to the gimbal about the vertical axis. The gyroscope is normally operated in a closed loop wherein the torquer output is used to drive the gimbal so that the pick-off output is nulled. The steady state current flowing in the torquer is then a measure of the input rate experienced by the gyroscope about the horizontal axis perpendicular to the gyro rotor spin axis. Because the system operates on a mount fixed with respect to the earth, the torquer current is actually a measure of the horizontal component of earth's rate.

In the gyroscope system in which the invention is to be applied and in its normal azimuth determining sequence, the steady state torquer current in the 0° position of the gyro casing is integrated for a predetermined processing time interval and is stored in an ancillary computer. The gyroscope casing is then re-indexed, being driven to its 90° position for this purpose. After an appropriate settling time, the torquer current is again integrated for the same time interval as was used during the 0° position and the results are again stored in the computer. The computer then calculates the arctangent of the quotient of the two stored values in the conventional manner and presents the results as the true azimuth orientation of the instrument.

Figure 1:
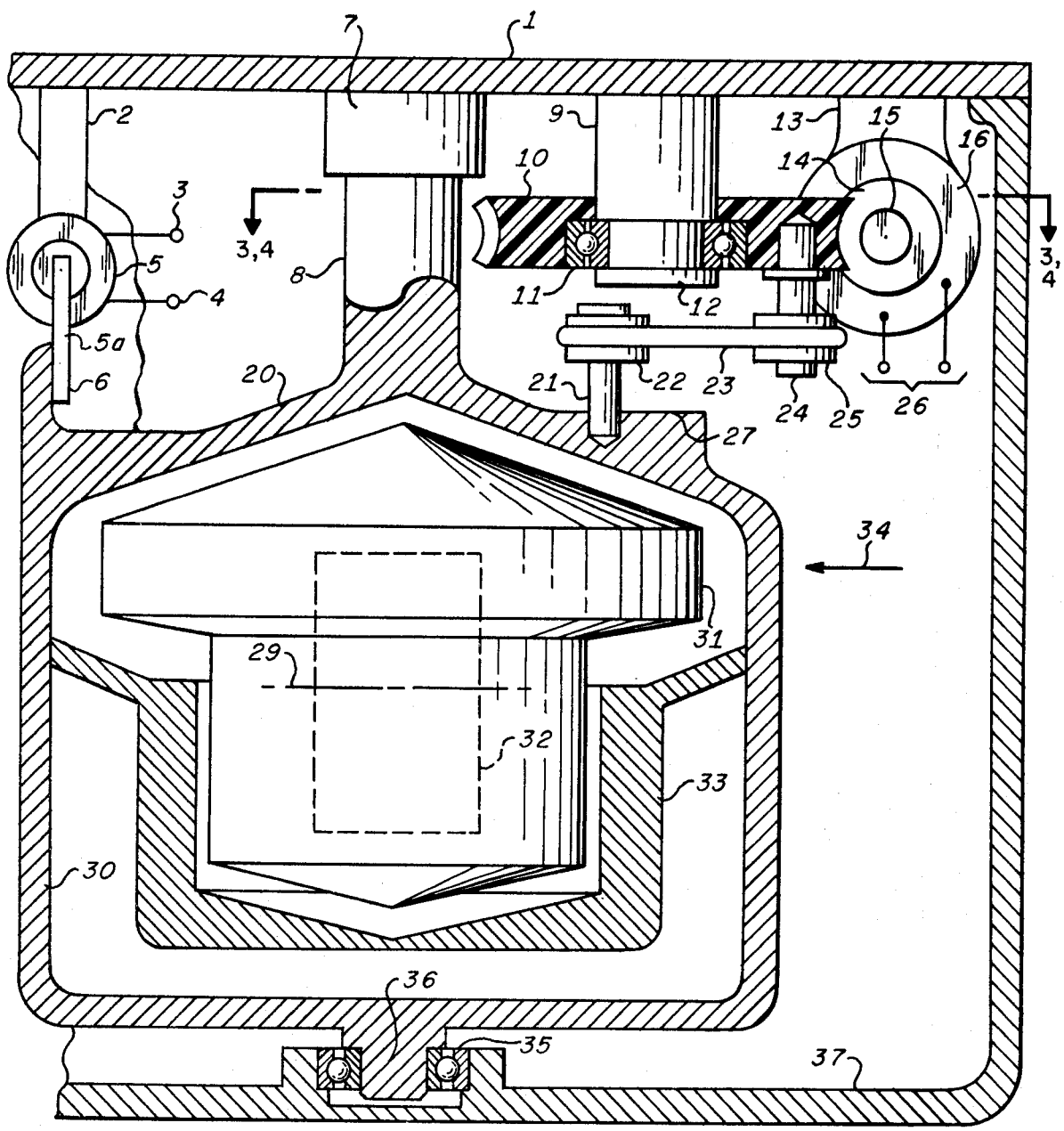
FIG. 1 is an elevation view, partly in cross section, showing the application of the invention to a floated land gyrocompass.

FIG. 1 illustrates an improved gyroscopic instrument such as has application, for example, as a land surveying compass, though the figure will also be understood equally well to represent any gyroscopic compass of the kind which benefits by including a facility for gyroscopic indexing. As illustrated, the instrument includes a conventional hermetically sealed floated gyroscopic sensitive element 31, containing a gyroscope rotor 32 mounted for spinning about an axis 29 fixed within sensitive element 31, axis 29 being normally disposed in a horizontal direction. If pendulously floated, the volume between inner wall 33 and the lower portion of sensitive element 31 will be occupied by a conventional floatation fluid such as fluorocarbon liquid up to the level generally indicated by arrow 34. It will be understood that the invention may readily be employed with gyroscopic instruments using other than floatation support, such as conventional support apparatus employing vertically and centrally disposed wires or other filaments for supporting the sensitive element 31 within the surrounding rotatable internal casing 20, 30, 33.

The gyroscopic compass includes an external casing 1, 37 which is normally hermeticaly sealed and may be supported by a tripod or other support means (not shown). External casing 1, 37 is substantially closed by the plate 1 which physically supports internal features of the instrument. In particular, the internal rotatable followup casing 20, 30, 33 is suspended from a central upper shaft 8 within a friction-free bearing 7, one part of the bearing being supported directly by plate 1. The central lower portion of the external casing 1, 37 may also be used to support the inner rotatable follow-up casing 20, 30, 33 by virtue of the friction-free bearing 35 interposed between elements 30 and 37 on a central stud 36 projecting downward from the bottom of the rotatable casing part 30. It will be understood that the interior of the instrument may also include other conventional apparatus such as various pick-offs, torquers, and centering devices and the like which do not necessarily form a particular part of the present invention and are therefore not illustrated in the drawings for the sake of their clarity.

Figure 3:
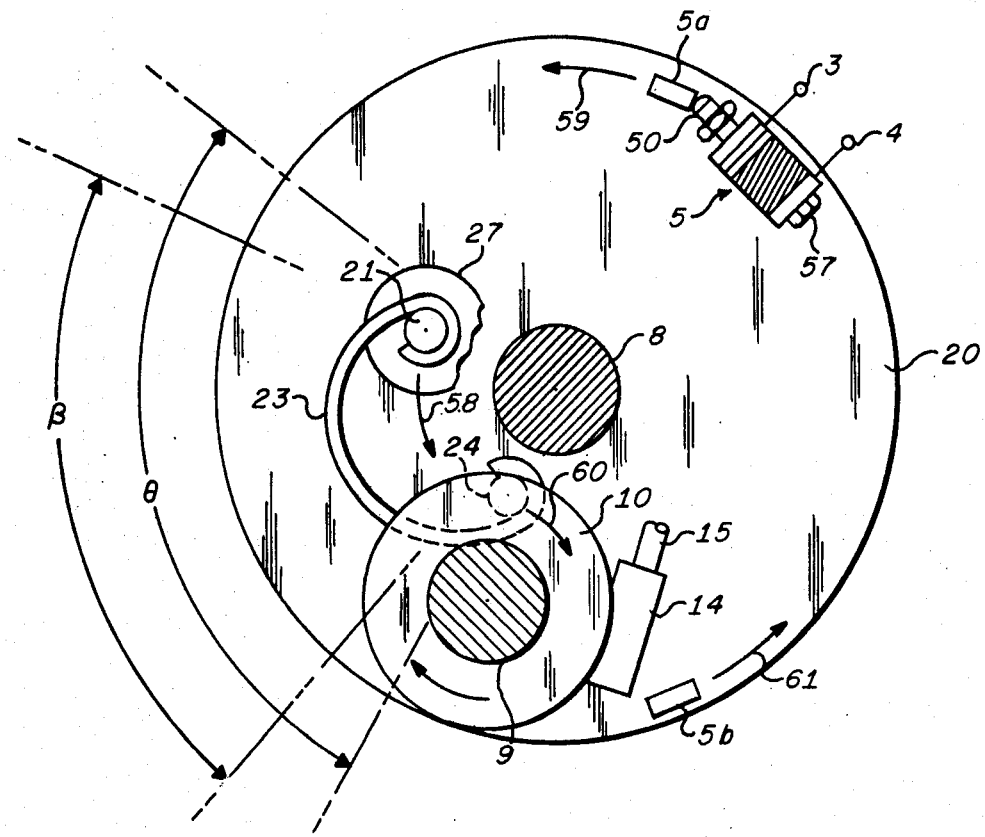
FIGS. 3 and 4 are fragmentary plan views, partly in cross section, taken along the line 3, 4 of FIG. 1.
Figure 4:
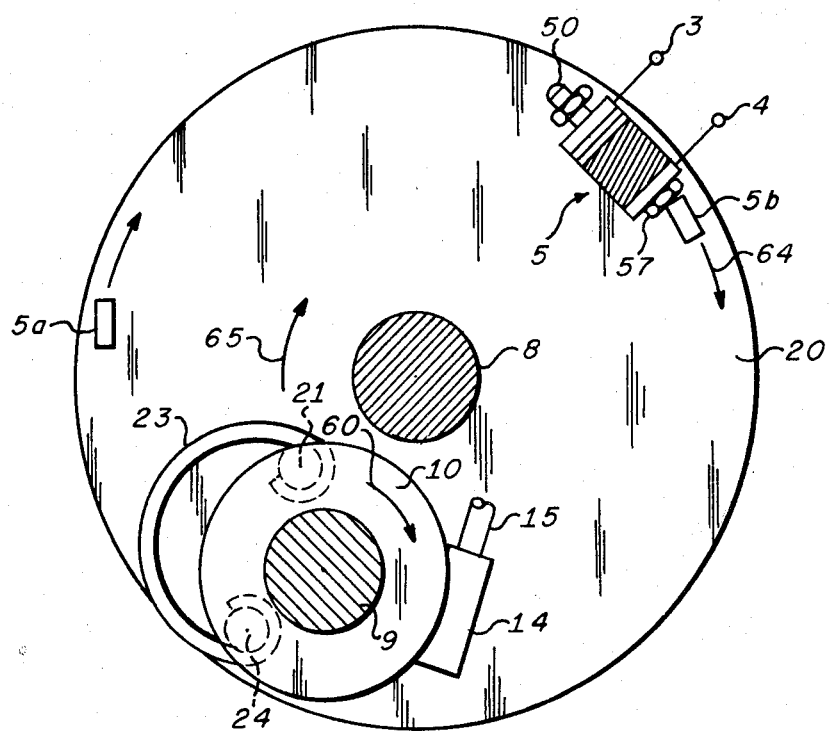

The principal parts of the invention include, as seen in FIG. 1, a mechanical-electrical stop element 5 affixed to plate 1 by strut 2 and cooperating with spaced-apart stop projections 5a, 5b. Stop projection 5a is affixed to the rotatable inner casing 30 at 6, while stop projection 5b is similarly fixed to casing 30 but, as seen in FIGS. 3 and 4, is angularly spaced therefrom, though is otherwise similar. The second part of the indexing apparatus cooperates with stop elements 5, 5a, 5b and is also supported from plate 1. This part of the indexing device includes a motor-driven flexible link system for oscillating the internal casing 20, 30, 33 about the axis common to shafts 8 and 36 in a particular manner yet to be described.

The oscillating mechanism is driven by the intermittently operated, non-reversing motor 16 attached by its support 13 to plate 1. Through the shaft 15 of motor 16, it drives a worm gear 14 when motor 16 is excited at input terminals 26 by an electrical signal yet to be described. Worm gear 14 drives a relatively large diameter worm wheel 10, which may be formed of a conventional plastic material, and which is supported from plate 1 by stud 9 through the low-friction bearing 11, the latter being held in place on stud 9 by cap 12. An eccentrically mounted crank pin 24 is affixed within the lower surface of worm wheel 10, its axis being off set from and parallel to the axis of stud 9. A cooperating crank pin 21 is affixed within the upper surface of boss 27 on the cover portion 20 of rotatable casing 20, 30, 33, the axis of pin 21 being suitably off set from and parallel to the axis of shaft 8. A flexible link 23, specific forms of which will be described in further detail, has each of its ends journalled upon and encircling a circumferential groove in a respective arbor 22, 25 of the respective crank pins 21, 24. The flexible link, shown also at 23 in FIG. 3, is formed and disposed in such a manner that the distance between the centers of journalling crank pins 21, 24 may change in a predetermined manner, but only slightly in normal operation, at spaced time intervals.

Figure 2:
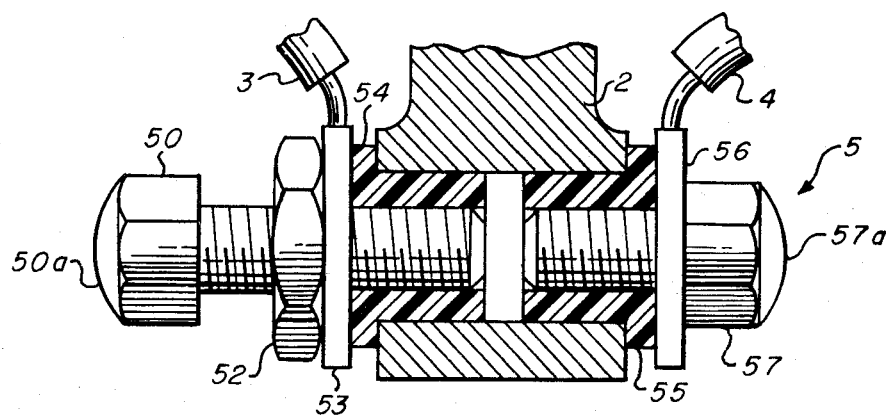
FIG. 2 is a view, partly in cross section, of a detail of FIG. 1.

As seen in FIGS. 1 through 4, an electrically sensing stop element 5 is supported by strut 2 from the upper stationary plate 1 of the external casing 1, 37 of the instrument and therefore remains stationary during azimuth oscillation of the inner rotatable casing 20, 30, 33. Referring to FIG. 2, the fixed stop element 5 utilizes a bore through the aforementioned strut 2 to embrace in fixed relation a pair of opposed cylindrical insulating inserts 54, 55, each having a threaded bore passing axially therethrough. The threaded bore of insert 55 accommodates an electrically conductive threaded bolt 57 which clamps a conductive apertured disk 56 against the exterior of insert 55. The head of bolt 57 has an electrical contacting surface 57a, while the conductive disk 56 forms a terminal for electrical lead 4. Insert 54 accommodates an electrically conductive threaded bolt 50, the inner ends of bolts 50, 57 being always in fixed non-contacting relation. A nut 52 threaded on bolt 50 clamps a further electrically conducting apertured disk 53 against the exterior flat surface of insert 54. The head of bolt 50 has an electrically contacting surface 50a, while the conductive disk 53 forms a terminal for electrical lead 3. Manipulation of bolt 50 and nut 52 permits adjustment of the effective length of the fixed stop element 5.

As mentioned in the foregoing, the fixed stop element 5 cooperates with spaced-apart stop projections 5a, 5b mounted for rotation with periphery of the upper portion 20 of rotatable casing 20, 30, 33. If stop projections 5a, 5b were removed and motor 16 energized, worm gear 14 on the shaft 15 of motor 16 could turn continuously in one direction as indicated by arrow 60 in FIGS. 3 and 4. Through the cooperation of flexible link 23, the gyroscope rotatable casing 20, 30, 33 would be oscillated about the axis of shaft 8 through a predetermined angle $\theta$ slightly larger than the actually desired precision gyro indexing angle $\beta$, which may be 90°. When stop projections 5a, 5b are affixed to the cover 20 in positions adjusted according to the magnitude of the desired indexing angle $\beta$ centered with respect to the full travel angle $\theta$, and when motor 16 is then operated continuously, the rotatable gyroscope casing 20, 30, 33 is driven continuously from stop 5a to stop 5b to stop 5a, et cetera, in repeating cycles. In view of the stop projections 5a, 5b and of the flexibility of link 23, the rotatable gyro casing 20, 30, 33 will dwell for a very short time as it successively impacts each stop projection 5a, 5b as the distance between the ends of the flexible connecting link 23 is stretched or compressed as is necessary to accommodate the effects of the angular difference between $\theta$ and $\beta$. FIG. 3 depicts the general situation just as stop projection 5a is leaving fixed stop element 5, moving in the counter-clockwise sense of arrow 59 because of the action of flexible link 23 in moving pin 21 counter-clockwise in the sense of the arcuate arrow 58. The opposite stop projection 5b is moving in the counter-clockwise sense of arrow 61 toward fixed stop 5. On the other hand, FIG. 4 represents the situation just as stop projection 5b is leaving fixed stop element 5 by moving in the clockwise sense of arrow 64 because of the action of flexible link 23 in moving pin 21 clockwise in the sense of the arcuate arrow 65.

it is desired to control the mechanism in a program making it useful for cooperation with an associated computer which, in itself, forms no necessary part of the present invention. The spaced-apart stop projections 5a, 5b are electrically grounded and the contacts 50a, 57a of the fixed stop element 5 are made independently electrically conducting. In this manner, each time a stop projection 5a or 5b hits a respective contact 50a or 57a, a corresponding signal circuit is rendered conductive, causing a control circuit to interrupt power flow to terminals 26 of motor 16. When motor 16 is turned off in this manner, its normal coast due to its inertia deflects spring linkage 23 slightly, thus keeping the active stop projection 5a or 5b firmly urged against one side or the other of the fixed stop element 5, and thus precisely determining the angular location of rotatable casing 20, 30, 33. Worm gear 14 is inherently held in a fixed position because of its natural relation to worm wheel 10 and the flexure forces of link 23 therefore can not cause any motion of worm wheel 10. After a predetermined known time passes required for the associated computer to complete its particular action, motor 16 is again energized, operating until the opposite stop projection impacts the fixed stop element 5. The reversing operation may continue many additional cycles, as required, and may be stopped at the will of the operator.

Figure 5:
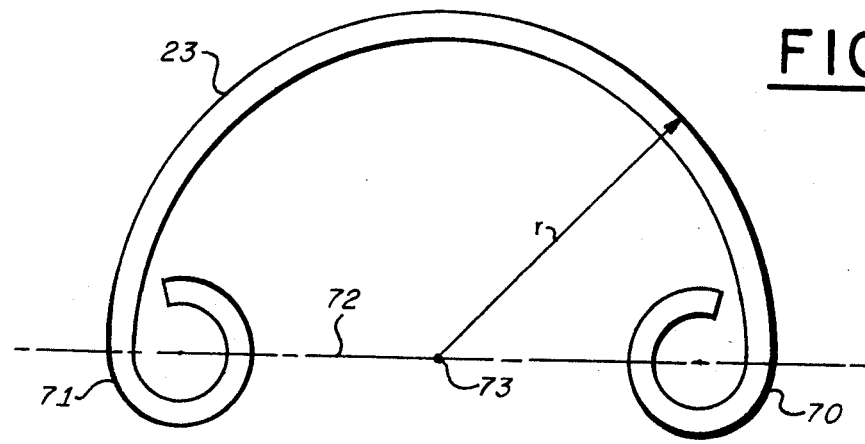
FIG. 5 is a plan view of a flexible link employed in FIGS. 1, 3, and 4.
Figure 6:
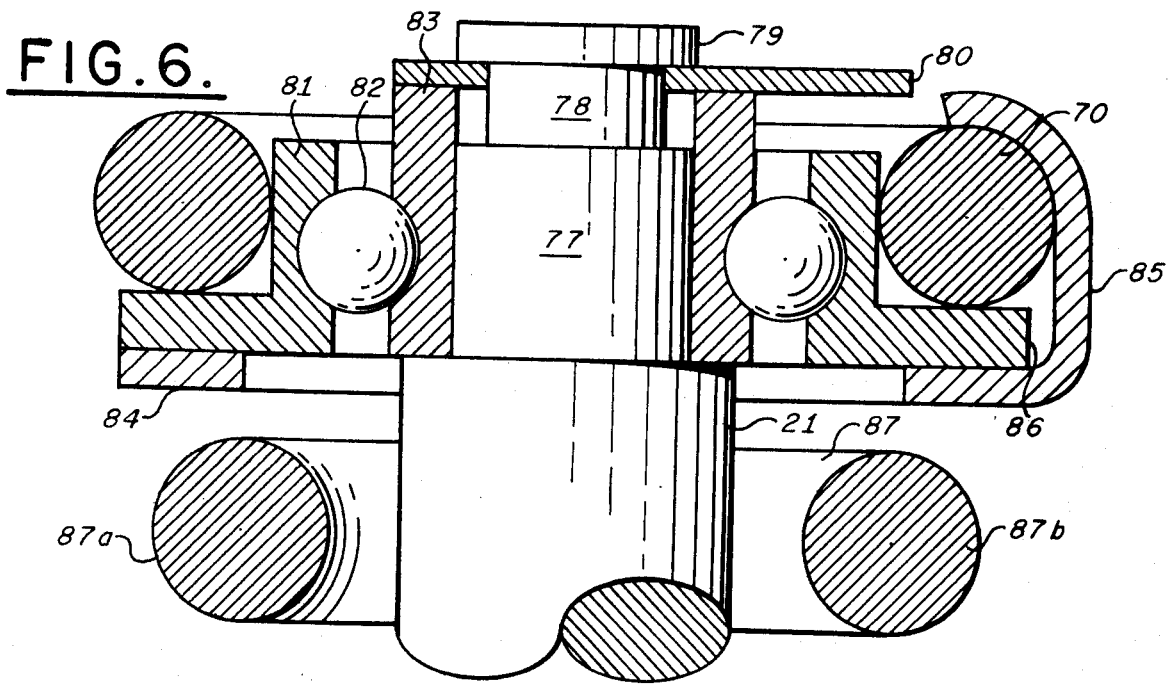
FIG. 6 is a detailed elevation view, partly in cross section, of an arrangement for attaching the flexible link of FIG. 5 in the gyrocompass of FIG. 1.

FIGS. 5 and 6 illustrate one form of the flexible link 23 and illustrate the manner in which the end loops 70, 71 of the link are attached on the respectively cooperating pins 21, 24. In FIG. 5, the link 23 consists of stainless steel wire, stress relieved, for example, for 30 minutes at 400° F. after forming. Typically, the wire of link 23 is 0.040 inches in diameter and the radius r is about 0.50 inches. The radius r is taken from the center 73 of the line 72 joining the centers of pins 21, 24 when link 23 is unstressed. The half-circle loop 23 is chosen because computation of the resultant forces on pins 21, 24 is more readily performed and the dimensions of the link are more readily established. The loops 70, 71 are coupled to the respective pins 21, 24 as shown in FIG. 6, which particularly illustrates the configuration for pin 21. The arrangement for pin 24 would be represented by turning the figure upside-down and eliminating the second loop 87, whose function remains to be discussed.

Figure 6A:
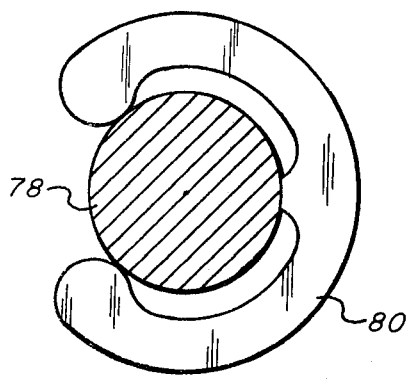
FIGS. 6A and 6B illustrate fastener parts used in the apparatus of FIG. 6.
Figure 6B:
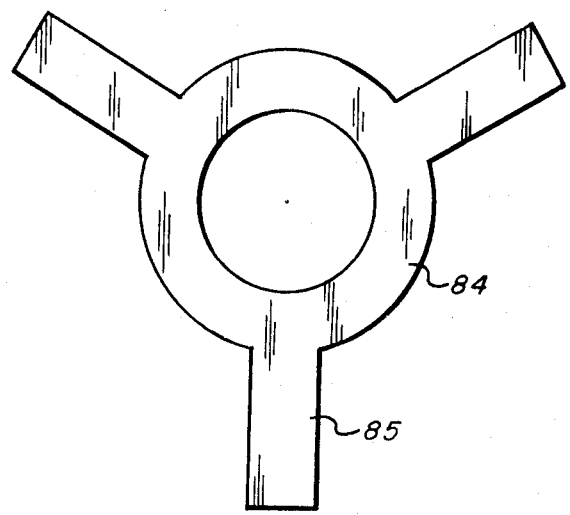

In FIG. 6, the typical loop 70 is press fitted about the outer race 81 of the flanged friction-free bearing comprising inter race 83, an assembly of bearing balls 82, and outer race 81. Loop 70 is firmly held in place by the three-fingered washerlike clamp 84 having a trio of bendable spring fingers 85 (FIG. 6B). The flat inner portion of clamp 84 and fingers 85, when bent in the position shown in FIG. 6, hold flange 86 of outer race 81 and the loop 70 in fixed contiguous relation. The inner race 83 of the bearing is slid over two axial extensions 77, 78 of pin 21 having progressively diminished diameters. A commercially available spring fastener 80 having a modified E shape (FIG. 6A) snaps over the restriction 78, trapping the inner race 83 between the fastener 80 and the annular face of pin 21.

Figure 7A:
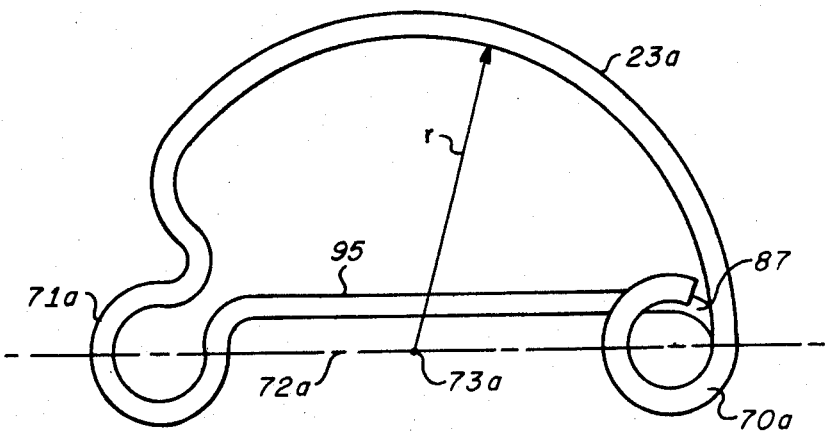
FIGS. 7A, 7B are respective plan and elevation views of a flexible link alternative to that of FIG. 1.
Figure 7B:
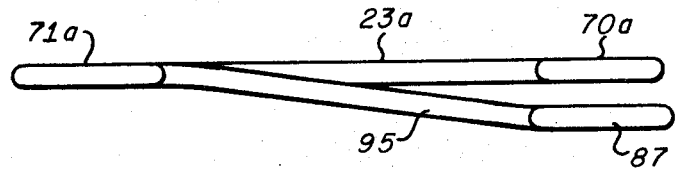

Alternative ways of accomplishing the purposes of the invention will be apparent to those skilled in the art as falling within the scope of the invention. For example, the structure for the flexible link shown in FIGS. 7A and 7B is of interest in certain instances in which the instrument, while being transported from one scene of operation to another, may be subjected to unusual shock or vibration which might permanently distort the simple flexible link 23 of FIG. 5. In FIGS. 7A, 7B, a semicircular flexible link 23a like link 23 is retained with its crank-pin encircling loops 70a, 71a corresponding respectively to loops 70, 71 of FIG. 5. To prevent excessive motion in either direction between loops 70a, 71a along line 72a, and consequent permanent distortion of link 23a, the wire thereof is extended from loop 71a as shown in FIGS. 7A, 7B to form a length 95 of straight wire nearly parallel to line 72a and ending in a further loop 87. Loop 87 loosely surrounds pin 21 as shown more clearly in FIG. 6 and the consequent clearance dimension initially permits free travel of loop 87 with respect to pin 21, normal operation of flexible link 23 during the interval of such normal travel, and prevention of further travel when either opposed inner surface location 87a, 87b of loop 87 impacts the mating surface of pin 21. In this manner, extensive undesired bending of flexible link 23a is prevented without interference with the normal operation of that link. With the use of either flexible linkage, the relative velocity between the fixed stop element 5 and a stop projection 5a or 5b is reduced to near zero at the point of actual contact, thus eliminating the need for a variable speed motor and its attendant controls. Since the casing 20, 30, 33 using the invention is not continuously rotated or continuously rotatable, electrical connections between it and the fixed external casing 1, 37 are readily made by flexible connectors and slip rings and their inherent problems are eliminated.

Figure 8:
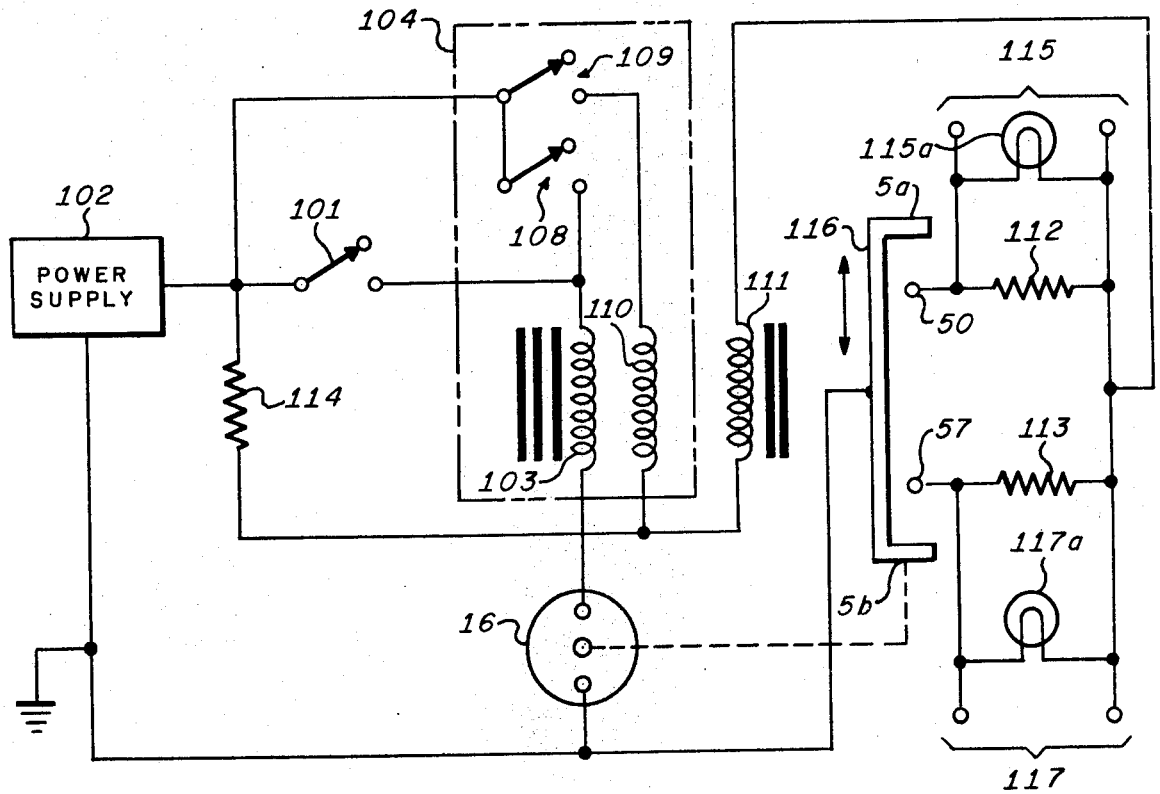
FIG. 8 is a diagram of a control circuit for operating the invention and disclosing electrical components and their interconnections.

Various electrical control means for operating the indexing equipment will readily be envisioned by those skilled in the art once the foregoing principles are understood and once the simple circuit of FIG. 8 is presented. Using that circuit, the indexing apparatus may be made to drive from one stop element 5a to the other (5b) by the use of motor 16 when switch 101 is manually or otherwise momentarily closed. With switch 101 closed, current flows from power supply 102 through coil 103 of relay 104 and thereby through motor 16. Motor 16 is shown for simplicity in FIG. 8 as a d.c. motor, and it will be clear that an analogous a.c. motor and control may readily be substituted. When motor 16 has driven the indexed assembly as represented at 116 away from stop 50 or stop 57 as previously described, relay 104 must close switches 108, 109, and switch 101 may then be allowed to open whether manually or otherwise operated. Motor 16 is still in closed circuit with power supply 102 and continues to run because switch 101 is now bypassed by the closure of switch 108.

When the indexed assembly 116 and one of its stop projections 5a and 5b reaches a respective stop element 50a or 50b, a circuit is completed through relay controlled switch 109; this event allows circuit to flow through relay coil 110, choke 111, and resistor 112 or 113. Relay coil 110 is wound in opposition to its associated relay coil 103 so that the magnetomotive force produced by current flowing through relay coil 103 and motor 16 is approximately equal and opposite to that produced by current flowing through relay coil 110 and resistor 112 or 113. Thus, the completion of the circuit by the closure against a fixed stop element 50 or 57 of a corresponding moving contact 5a or 5b causes relay 104 to open switches 108, 109, thereby stopping motor 16. Choke 111 serves to delay the build-up of current through coil 110, thus causing motor 16 to run for a short time after stop contact is made. It will be understood that switch 101 may ultimately be manually closed or closed by a timer or by the associated computer so that the control circuit of FIG. 8 repeats its cycle at the opposite stop situation. It will be seen that the arrangement demonstrates several advantages permitting simple undirectional motor rotation with simple on-off control. A flexible connecting link mechanism is used that achieves desirable low-velocity impact of mechanical stops. The worm and worm wheel drive and spring connecting link combination yield precise positive engagement of stop elements. As will be further shown, the mechanical stops also serve as electrical contacts and thus provide a convenient means for indicating positive stop engagement.

Separate electric signals are thus provided to indicate when the assembly has moved so that one or the other of the stop projections is bearing firmly and precisely against one end or the other of the fixed stop 5. This feature develops through the disposal of resistors 112, 113 and lamps 115a and 117a and the passage of current through one or the other of resistors 112, 113 when one of stop projections 5a or 5b, respectively, is contacted. Because of the visual application of this signal or its use in associated computer means coupled to terminals 115, 117 and forming no necessary part of this invention, it is desired that the voltages when present at terminals 115 or 117 be maintained, even when the relay swithes 108, 109 are open; the circuit is completed through resistor 114. Resistor 114 has a relatively high resistance and very little current is drawn from supply 102 for this output signal purpose. Note that whenever switch 101 is closed and then opened, the assembly 116 will be driven until either stop projection 5a or 5b is closed against a corresponding stop contact 50 or 57. It will be seen that the function of the circuit of FIG. 8 is to drive the rotatable element 20, 30, 33 from a zero to a 90° position, holding it in firm indexed contact there for a period of time necessary for example, for the mental observation of gyro outputs and for the making of certain calculations, as discussed in the foregoing. The assembly is then returned to its zero degree position and held in firmly fixed position for the same purpose, after which computations made on the successive operations may be rapidly completed.

It will, of course, be understood that the positive and precise engagement of the stops according to the present invention when the drive motor is deenergized a short time after a stop is contacted is of particular benefit, since the inertia of the drive motor is insufficient reliably to provide optimum coast. In general, the invention provides a precision instrumentality for precisely changing the mechanical position of a gyroscopic senitive element with respect to a mounting reference so that the two orthogonol components of earth's rate may be accurately detected, and the alignment of the gyro axes precisely determined. In application in a land gyrocompass, the novel indexing mechanism provides a low cost, small, light weight package having low power consumption and low audible noise characteristics. The invention can be extended for application also in gyro instruments requiring 0° to 180° indexing capabilities, for example.

While the invention has been described in its preferred embodiment, it is to be understood that the words which have been used are words of description rather than of limitation and that changes within the purview of the appended claims may be made without departing from the true scope and spirit of the invention in its broader aspects.

I claim:

1. In a gyroscopic compass:
   rotatable internal casing means journaled about a normally vertical axis within external casing means,
   sensitive gyroscopic means supported within said rotatable internal casing means and having an axis normally coinciding with said normally vertical axis,
   motive means including non-reversing motor means within said external casing means for intermittently oscillating said rotatable internal casing means about said normally vertical axis,
   said motive means including flexible link means coupling said motor means to said rotatable internal casing means,
   mechanical stop means for precisely fixing the limits of said intermittent oscillations in cooperation with said flexible link means, and
   electrical contact means integral with said mechanical stop means whereby said motor means is driven for a predetermined time after each operation of said contact means whereby said flexure means is flexed to a predetermined degree.

2. Apparatus as described in claim 1 wherein said motive means includes:
   gearing means responsive to said non-reversing motor means for rotation about an axis parallel to said normally vertical axis,
   first crank pin means extending from said gearing means, and second crank pin means extending from said rotatable internal casing means,
   said first and second crank pin means having substantially parallel axes,
   said flexible link means coupling said first and second crank pins means each in journalled relation with said flexible link means.

3. Apparatus as described in claim 1 wherein said flexible link means comprises arcuate linkage means having first journal means at one end thereof with respect to said motor means and second journal means at another end thereof with respect to said rotatable internal casing means.

4. Apparatus as described in claim 3 wherein said arcuate linkage means is semi-circular in shape and is formed of round stress-relieved stainless steel wire.

5. Apparatus as described in claim 3 wherein said arcuate linkage means has a radius centered at the midpoint between said first and second journal means.

6. Apparatus as described in claim 3 including means formed integrally with said flexible link means for preventing excessive shock or vibration induced motion between said first and second journal means, thereby preventing permanent distorting flexure of said flexible link means.

7. Apparatus as described in claim 1 wherein said mechanical stop means comprises:
   common stop means affixed to said external casing means,
   first and second spaced-apart stop projection means affixed to the periphery of said rotatable casing means,
   said common stop means and said first stop projection means cooperatively providing first electrical contact means for one sense of rotation of said rotatable casing means, and
   said common stop means and said second projection means cooperatively providing second electrical contact means for a second sense of rotation of said rotatable casing means.

8. Apparatus as described in claim 7 further providing additional means for utilizing the respective alternative outputs of said first or second electrical contact means.

* * * * *